(12) United States Patent
Flores et al.

(10) Patent No.: US 9,866,902 B2
(45) Date of Patent: Jan. 9, 2018

(54) SOCIAL SHARING AND UNLOCKING OF REACTIONS TO CONTENT

(71) Applicant: Verizon Patent and Licensing Inc., Arlington, VA (US)

(72) Inventors: Kevin Flores, San Jose, CA (US); Devin Blong, Penngrove, CA (US); Tushar Chaudhary, San Francisco, CA (US); Manish Sharma, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/000,946

(22) Filed: Jan. 19, 2016

(65) Prior Publication Data

US 2017/0208362 A1 Jul. 20, 2017

(51) Int. Cl.
| | |
|---|---|
| *H04N 21/274* | (2011.01) |
| *H04N 21/442* | (2011.01) |
| *H04L 29/06* | (2006.01) |
| *H04L 29/08* | (2006.01) |
| *H04N 21/454* | (2011.01) |
| *H04N 21/258* | (2011.01) |
| *H04N 21/234* | (2011.01) |
| *H04N 21/4788* | (2011.01) |

(52) U.S. Cl.
CPC ..... *H04N 21/44218* (2013.01); *H04L 65/403* (2013.01); *H04L 65/60* (2013.01); *H04L 67/10* (2013.01); *H04N 21/23424* (2013.01); *H04N 21/25875* (2013.01); *H04N 21/25891* (2013.01); *H04N 21/454* (2013.01); *H04N 21/4788* (2013.01)

(58) Field of Classification Search
None
See application file for complete search history.

(56) References Cited

U.S. PATENT DOCUMENTS

| 2014/0096167 A1* | 4/2014 | Lang | H04N 21/4788 |
| | | | 725/91 |
| 2014/0223464 A1* | 8/2014 | Moran | H04N 21/4788 |
| | | | 725/12 |

* cited by examiner

*Primary Examiner* — Pankaj Kumar
*Assistant Examiner* — Charles N Hicks

(57) ABSTRACT

Viewers of a video content item may provide reaction videos, that show the viewer's reactions to a content item while the viewers view the content item. The reaction videos may be provided to a friend, or other member of a social circle of the viewers, when the friend views the content item. The reaction videos may be locked until the friend provides consent to have his or her reaction captured while watching the content.

20 Claims, 12 Drawing Sheets

500 ⟶

| User | Genres liked | Demographics information |
|---|---|---|
| Alice | Horror, comedy, drama | 18, female |
| Bob | Drama, horror | 19, male |
| Carla | Comedy, horror | 18, male |
| Dave | Horror, drama | 21, female |

600 ⟶

| User | Social Group |
|---|---|
| Alice | Bob, Carla, Dave |
| Bob | Alice, Carla, Dave |
| Carla | Alice, Bob |
| Dave | Alice, Bob |

SOCIAL SHARING AND UNLOCKING OF REACTIONS TO CONTENT

BACKGROUND

Content providers and content producers, such as those who provide and create video content, often seek ways to enhance the content. Such content may include live broadcasts of sporting events, on-demand or broadcasted comedy shows, pre-recorded movies, etc. Audiences may often audibly respond to content as they view the content, such as by laughing, gasping, crying, screaming, etc. Individuals may have social circles, such as groups of friends, who share the same interests and may be interested in seeing their friends' reactions to content (e.g., video content).

DETAILED DESCRIPTION OF PREFERRED EMBODIMENTS

The following detailed description refers to the accompanying drawings. The same reference numbers in different drawings may identify the same or similar elements.

Content providers and/or content producers may seek to enhance content (e.g., streaming, pre-recorded, and/or live broadcasted video content), by adding audience reactions to the content, such as laughter, gasping, crying, or other audible reactions. The addition of such reactions may increase the immersive experience of viewers accessing the content. For instance, in a stand-up comedy presentation, the addition of laughter from actual viewers of the content may make subsequent viewers feel like they are in a comedy club watching the comedy performance. As another example, the addition of gasps or screams, from actual viewers of a horror movie, may add to the excitement or suspense of subsequent viewers.

Furthermore, viewers may be interested in seeing how their friends have reacted when watching the same video content. For instance, a particular user may have a group of friends, such as friends in a social networking platform, frequently called contacts, and/or some other group of friends. In some situations, one or more of the user's friends may have viewed a video, and the friend's reactions may have been captured while the friend viewed the video. In accordance with some implementations, the reactions, of the user's friends, may be provided to the user. In some implementations, the user's participation (e.g., consent to record his or her own reactions) may be a prerequisite to viewing the reactions of the friends.

Figure 1:
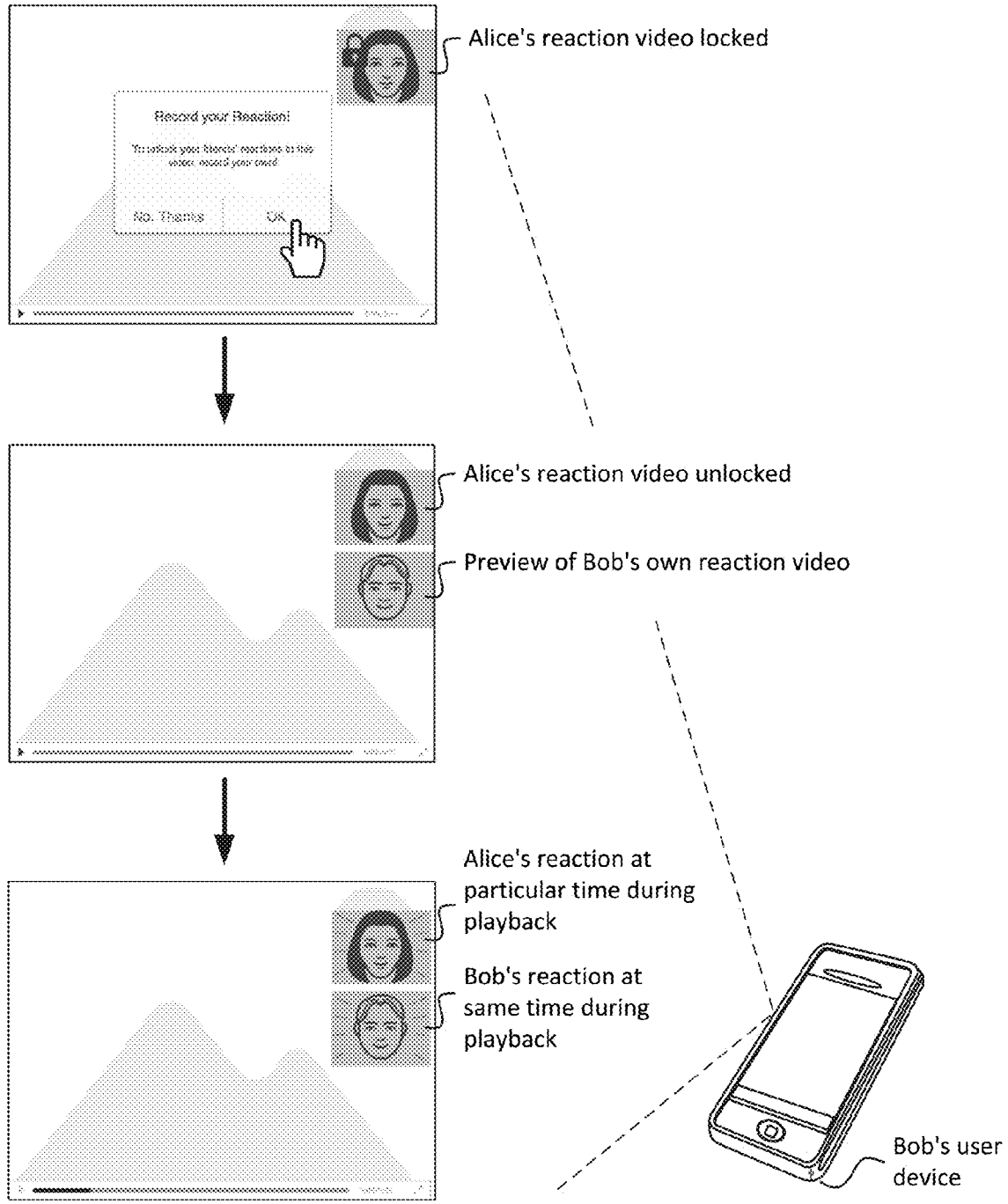
FIGS. 1 and 2 illustrate an example overview of one or more implementations described herein, in which users may unlock reactions of other users to a particular item of video content.

For instance, as shown in FIG. 1, assume that a first user, Bob, is accessing video content on his user device (e.g., his smart phone or tablet computer). As also shown, Bob's friend Alice may have previously viewed the video, and her reactions to the video may have been previously captured. When accessing the content, information may be presented to Bob, indicating that a reaction video, for Alice, is available. For instance, as shown, a pop-up dialog box may state that a reaction video for Alice is available. Additionally, or alternatively, a thumbnail may be presented (e.g., a contact or profile picture associated with Alice, or a particular frame or portion of the reaction video).

Furthermore, in accordance with some implementations, Alice's reaction video may be "locked," in that Bob may not be allowed to view the reaction video (e.g., the reaction video will not be sent to Bob's user device) unless the reaction video is "unlocked." In accordance with some implementations, Bob may unlock the reaction video by consenting to have his own reaction video recorded while watching the content. As shown in the example of FIG. 1, Bob may provide such consent (e.g., by clicking an "OK" button in the dialog box).

Once Bob has consented to provide a reaction video, Alice's reaction video may be unlocked, and may be played during the playback of the content. In some implementations, Bob's own reaction video may also be shown (e.g., a live preview of Bob, while Bob watches the content). In some situations, Alice and Bob may react to the video content at the same time, which may enhance Bob's user experience. Once Bob's reaction has been recorded, the reaction video associated with Bob may be uploaded to a server and utilized at a later time (e.g., if a friend of Bob accesses the same video content).

Figure 2:
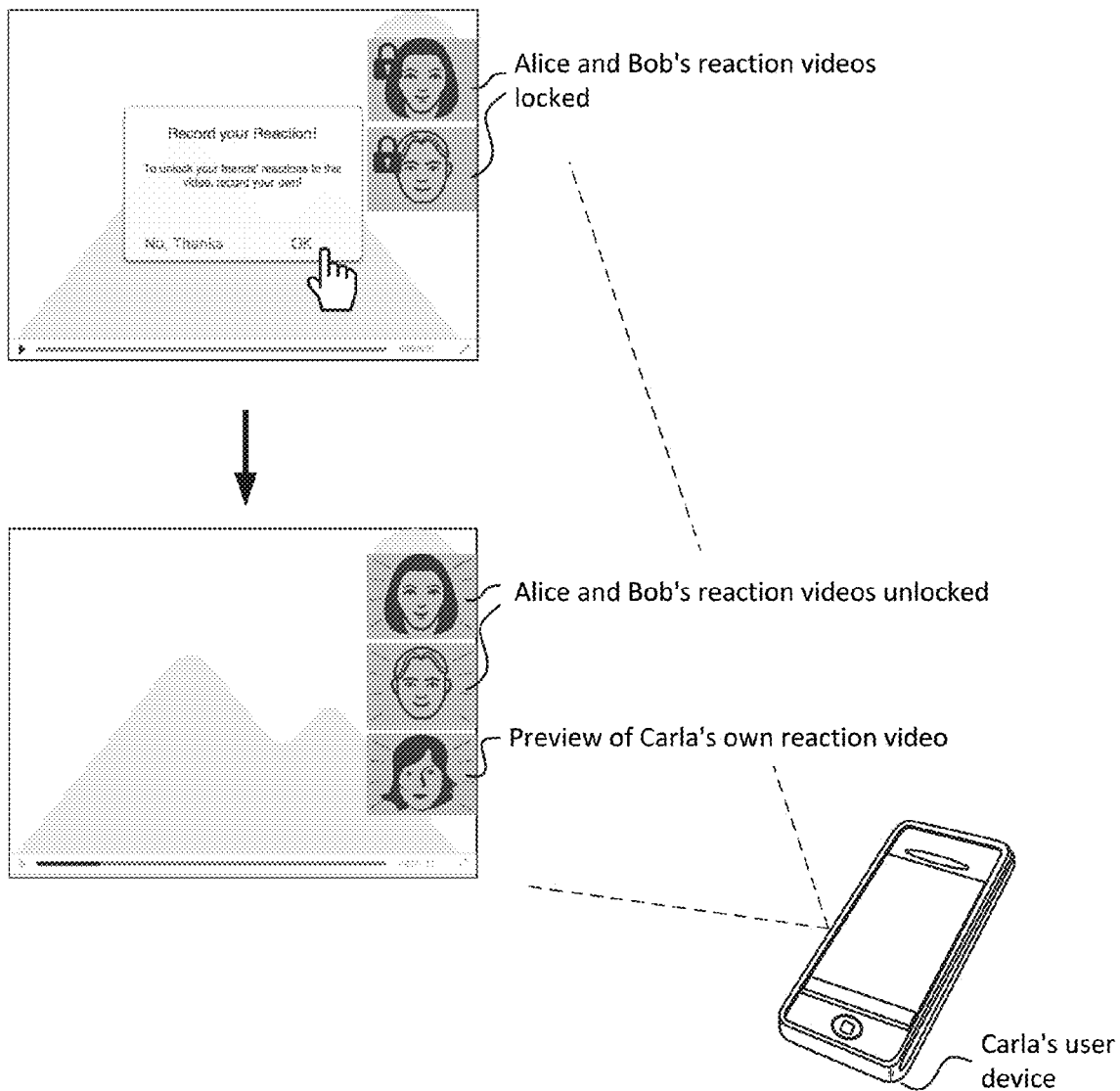

For instance, as shown in FIG. 2, another user, Carla, may access the same video content. Carla may be friends with Alice and Bob (e.g., may be friends with Alice and/or Bob on a social networking platform, may frequently contact Alice and/or Bob via telephone or text message, etc.). When Carla accesses the video content, Carla may be notified that Alice and Bob have previously recorded reactions to the video content. As similarly discussed above, Alice and Bob's reaction videos may be "locked" unless Carla consents to providing a reaction video herself. Once Carla consents to providing a reaction video, Alice and Bob's reaction videos may be "unlocked" and played during the presentation of the video content.

Figure 3:
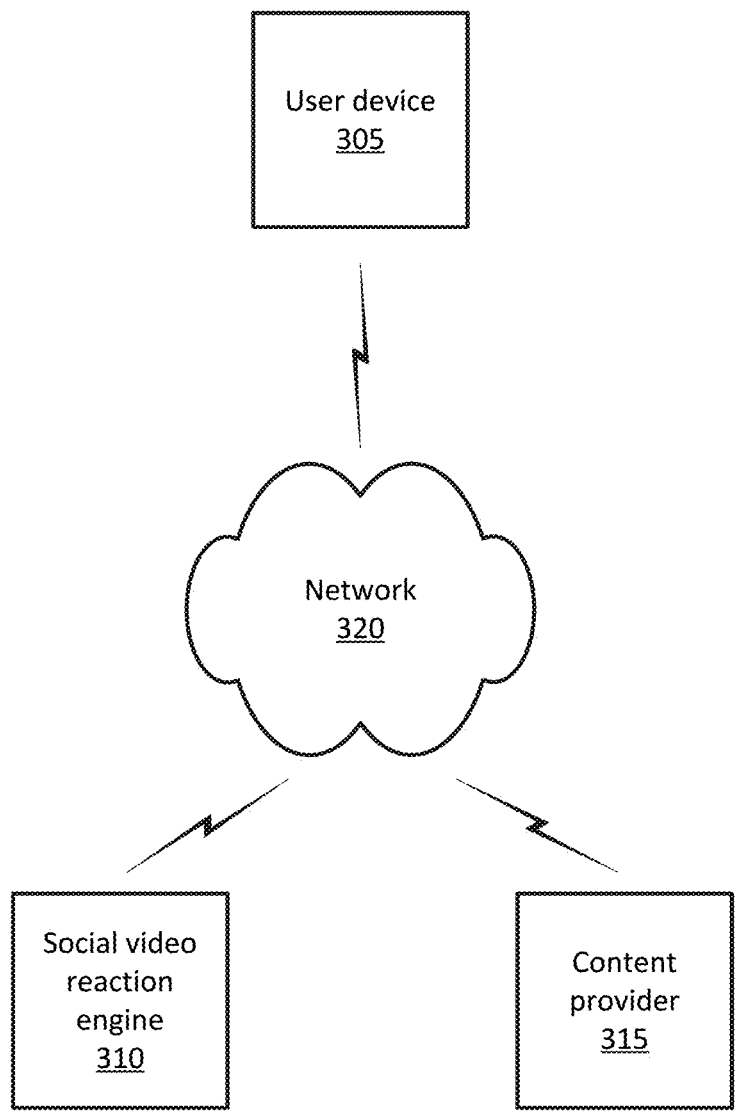
FIG. 3 illustrates an example environment, in which systems and/or methods, described herein, may be implemented.

FIG. 3 illustrates an example environment 300, in which systems and/or methods described herein may be implemented. As shown in FIG. 3, environment 300 may include user device 305, social video reaction engine 310, content provider 315, and network 320.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300. Also, while "direct" connections are shown in FIG. 3 between certain devices, some devices may communicate with each other via network 320 (and/or another network).

User device 305 may include any computation and communication device that is capable of communicating with one or more networks (e.g., network 320). For example, user device 305 may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a set-top device ("STD"), a personal gaming system, a wearable device, and/or another type of computation and communication device. User device 305 may include logic and/or hardware circuitry to communicate via one or more "short range" wireless protocols, such as WiFi (e.g., based on an Institute of Electrical and Electronics Engineers Institute of Electrical and Electronics Engineers ("IEEE") 802.11-based standard), Bluetooth, Near Field Communications ("NFC"), ZigBee (e.g., based on an IEEE 803.15.4-based standard), or the like. User device 305 may also include logic and/or hardware circuitry to communicate via a wireless telecommunications protocol (e.g., via cellular network 310), such as Long-Term Evolution ("LTE"), Third Generation Partnership Project ("3GPP") Third Generation ("3G"), Code Division Multiple Access ("CDMA") 3000 1X, and/or another wireless telecommunications protocol.

Social video reaction engine 310 may include one or more server devices (e.g., a single physical device or a distributed set of devices) that perform one or more functions related to obtaining and/or providing reaction videos, as described herein. For example, social video reaction engine 310 may receive and/or automatically obtain reaction videos from one or more user devices 305 (e.g., audio and/or video recorded by cameras and/or microphones of respective user devices 305), and may provide the reaction videos to other user devices 305 when the other user devices 305 access the content. In some implementations, social video reaction engine 310 may receive information indicating trigger points, in the content, at which reaction videos should be provided. The functionality of social video reaction engine 310 is described in greater detail below.

Content provider 315 may include one or more server devices (e.g., a single physical device or a distributed set of devices) that provide content (e.g., streaming content) to user device 305. Content provider 315 may receive requests from user device 305 for content (e.g., content specified in a particular playlist), and may provide the content to user device 305 in a streaming manner. In some implementations, content provider 315 may be, or may be communicatively coupled to, a content delivery network ("CDN"), which may cache content at "edges" of networks, in order to reduce the load within a network (e.g., within an Internet service provider's network).

Network 320 may include one or more radio access networks ("RANs"), via which user device 305 may access one or more other networks or devices, a core network of a wireless telecommunications network, an Internet Protocol ("IP")-based packet data network ("PDN"), a wide area network ("WAN") such as the Internet, a private enterprise network, and/or one or more other networks. User device 305 may connect, via network 320, to data servers, application servers, other user devices 305, etc. Network 320 may be connected to one or more other networks, such as a public switched telephone network ("PSTN"), a public land mobile network ("PLMN"), and/or another network.

Figure 4:
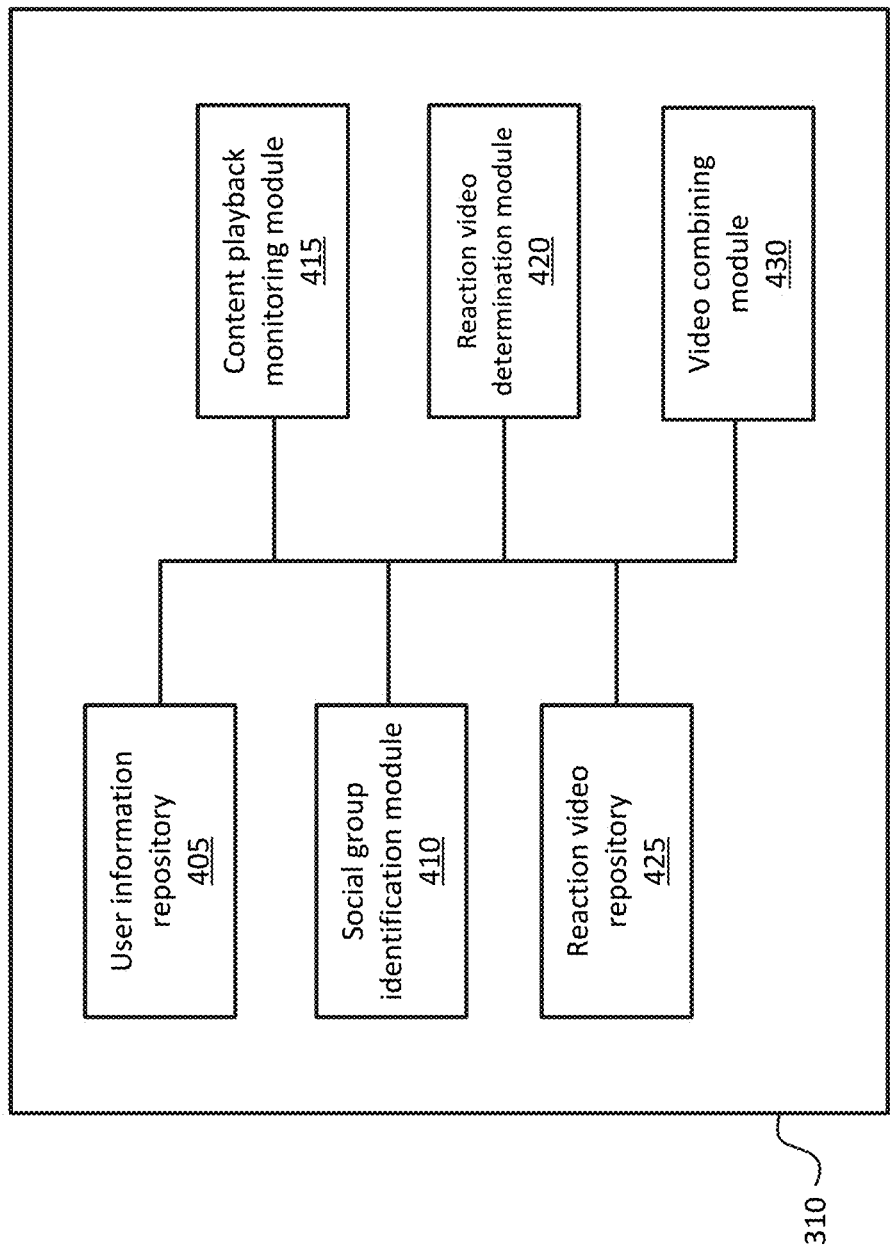
FIG. 4 illustrates example functional components of a social video reaction engine.

FIG. 4 illustrates example functional components of social video reaction engine 310. As shown, social video reaction engine 310 may include user information repository 405, social group identification module 410, content playback monitoring module 415, reaction video determination module 420, reaction video repository 425, and/or video combining module 430. Some or all of components 405-430 may be implemented as hardware circuitry, software logic, and/or some combination thereof. In some implementations, social video reaction engine 310 may include additional components, fewer components, and/or differently arranged components than shown in FIG. 4. In some implementations, one or more components, shown in FIG. 4, may be implemented by a device external to social video reaction engine 310.

User information repository 405 may receive, store, and/or output information associated with one or more users. The users may correspond to potential or past users who have accessed content, or may access content in the future. Examples of the types of information that may be stored by user information repository 405 are described in greater detail below. Briefly, the information, stored by user information repository 405, may include names of users, preferences of users (e.g., genres of content accessed by users), user history information (e.g., content accessing history, messaging history, telephone call history, etc.), social information (e.g., information identifying friends in a social networking platform) and/or other types of user-specific information.

The information, stored by user information repository 405, may include information provided directly from a user (e.g., via a questionnaire), and/or information collected based on user activities (e.g., by a device or service not explicitly shown in FIG. 2). As mentioned above, the information, stored by user information repository 405, may include information obtained from a social networking platform, such as a list of friends (i.e., other users) who have been identified as friends of particular users (e.g., users may manually specify friends, and/or friendships (or other types of relationships) may be automatically derived using other techniques). As another example, user information repository 405 may include information provided by a wireless telecommunications network provider, and/or another service that automatically collects and/or analyzes user information (with user consent).

Users may be given the choice to "opt in" to services that collect information regarding user activities, before any such services begin collecting such information. Further, users may be given the choice to "opt out" of similar services, and/or to access or delete any and all information collected by way of any such collection service. Users may be given the opportunity to temporarily "turn off" information collection (e.g., for a specific period of time, and/or indefinitely), and/or to be notified when any such information collection is taking place.

Figures 5, 6A, 6B:
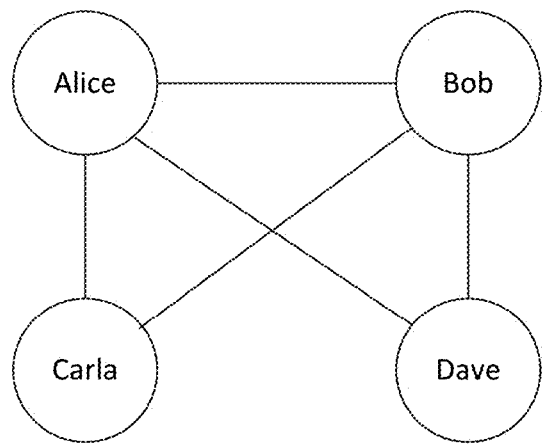
FIGS. 5, 6A, and 6B illustrate example representations of data that may be stored by a social video reaction engine.

FIG. 5 illustrates an example data structure 500, which may represent information stored by user information repository 405. For example, as shown, data structure 500 may include information regarding the example users Alice, Bob, Carla, and Dave. Data structure 500 may store information regarding genres of content that particular users like, as well as demographics information. As mentioned above, the information may be received from the users themselves, from social networking platforms, and/or from other sources.

In some implementations, user information repository 405 may store additional and/or different information, such as location information (e.g., a present location of a particular user), location history information (e.g., past locations of a particular user), content access history information (e.g., past content accessed by a particular user), contact history information (e.g., identifications of users whom a particular user has contacted, such as via telephone, text, email message, etc.), and/or other user information. As described below, the information stored by user information repository 405 (e.g., as represented by example data structure 500) may be used in identifying a user's friends, which may facilitate a determination of whether the user's friends have provided reactions to a particular content item.

Returning to FIG. 4, social group identification module 410 may identify social groups, based on some or all of the information stored in user information repository 405. For example, as mentioned above, user information repository 405 may store information indicating friends (and/or other types of contacts) associated with particular users. In some implementations, social group identification module 410 may identify "friends" of particular users based on whether two users are connected on a social networking platform. For example, if the users Alice and Bob are "friends" on a social networking platform, social group identification module 410 may identify that Alice and Bob are in the same social group. As another example, if Alice and Bob frequently speak on the phone or message each other via text (e.g., as indicated by user information stored by user information repository 405), then social group identification module 410 may identify that Alice and Bob are in the same social group.

FIG. 6A conceptually illustrates an example of users and "friends" of the users. For instance, as represented by the lines that connect the names of the users in the figure, the user named Alice may be related to, or "friends with," users named Bob, Carla, and Dave; Bob may be friends with Alice, Carla, and Dave; Carla may be friends with Alice and Bob; and Dave may be friends with Alice and Bob. Thus, Alice's "social group" may include Alice, Bob, Carla, and Dave, while Dave's "social group" may include Alice, Bob, and Dave. FIG. 6B illustrates an example data structure 600, which may be stored by social group identification module 410, and may be a representation of the relationships shown in FIG. 6A. For instance, the row associated with Alice may indicate that Alice's social group includes Bob, Carla, and Dave.

Returning again to FIG. 4, content playback monitoring module 415 may receive indications, from user device 305, that user device 305 has received and/or has begun playing a particular content item. Content playback monitoring module 415 may include an interface, such as an implementation of an application programming interface ("API"), via which content playback monitoring module 415 communicates with user device 305. For instance, content playback monitoring module 415 may receive an identification of the content received and/or played by user device 305, and/or an identification of a user of user device 305 (or of user device 305 itself). Content playback monitoring module 415 may notify reaction video determination module 420 that the content has been received and/or played by user device 305.

Based on receiving the indication from content playback monitoring module 415, reaction video determination module 420 may determine whether a reaction video is available for one or more users in a social circle of a user of user device 305. For example, reaction video determination module 420 may use information, stored and/or determined by social group identification module 410, in identifying users in the social circle. Reaction video repository 425 may store reaction videos (e.g., previously recorded reaction videos), and may be checked by reaction video determination module 420. Reaction video determination module 420 may also determine whether reaction videos should be provided to user device 305, when reaction videos are available. For example, reaction video determination module 420 may request, via content playback monitoring module 415, consent to capture and/or store a reaction video from user device 305, before friends' reaction videos can be sent to user device 305.

Once reaction video determination module 420 has determined that user device 305 is eligible to receive friends' reaction videos (e.g., after receiving consent from user device 305), reaction video determination module 420 may select one or more reaction videos from reaction video repository 425. For example, reaction video determination module 420 may select up to a maximum quantity (e.g., up to three reaction videos, up to five reaction videos, and/or some other quantity) of reaction videos stored by reaction video repository 425. In some implementations, reaction video determination module 420 may select the most recent reaction videos. In some implementations, reaction video determination module 420 may select reaction videos based on how close a relationship between the user of user device 305 and friends for whom a reaction video is available. For example, a first friend, with whom the user communicates (e.g., via telephone or text message) more frequently than a second friend, may be considered as having a closer relationship with the user. As another example, reaction video determination module 420 may select reaction videos based on common interests. For example, assume that the user of user device 305 enjoys horror movies. A reaction video from a friend who also enjoys horror movies may be selected, in favor of a reaction video from a friend who does not enjoy horror movies.

In cases where the content, requested by user device 305, is streaming content, reaction video determination module 420 may indicate, to video combining module 430, which reaction videos have been selected. Video combining module 430 may obtain the streaming content from content provider 315, mix the reaction videos and the streaming content, and stream the combined video (i.e., the combined video that includes the reaction videos and the originally requested content) to user device 305.

Figure 7:
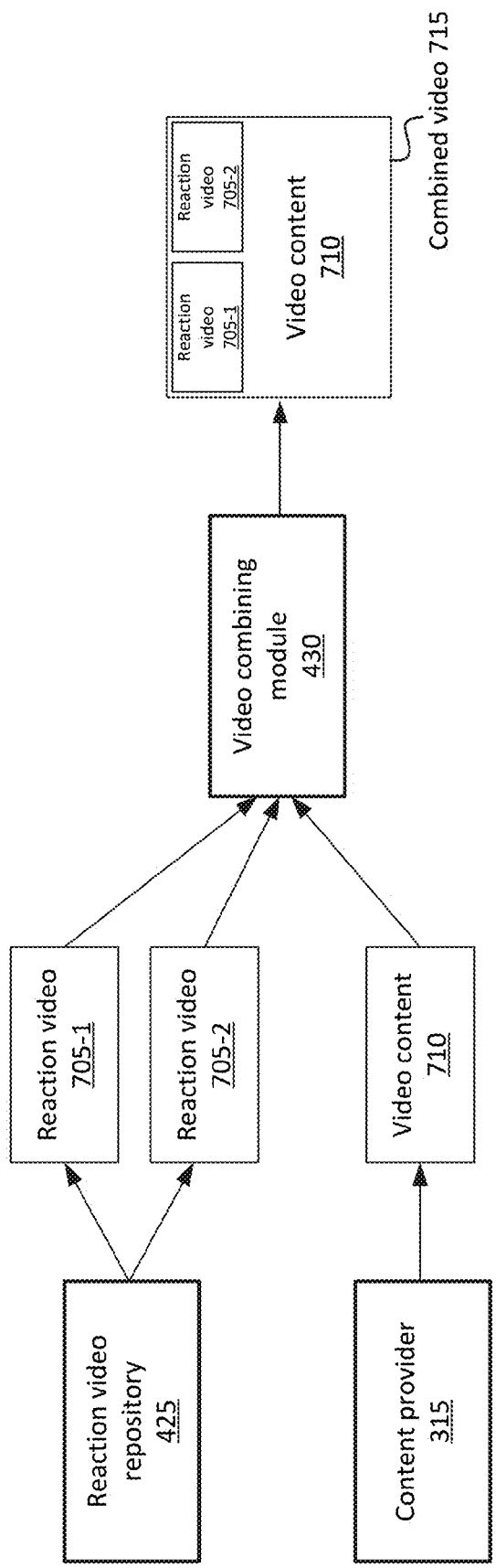
FIG. 7 illustrates an example signal flow that may yield a video content item and one or more reaction videos in a single combined video stream.

For example, as shown in FIG. 7, reaction videos 705-1 and 705-2 may be selected from reaction video repository 425. Video combining module 430 may combine reaction videos 705-1 and 705-2 with video content 710, retrieved from content provider 315, and combine reaction videos 705-1 and 705-2 with video content 710, to obtain combined video 715. Combined video 715 may include display areas that each correspond to a respective one of reaction video 705-1 or 705-2, as well as a display area that corresponds to video content 710. Reaction videos 705-1 and/or 705-2 may obscure a portion of the original video content 710. By combining reaction videos with video content, network resources may be saved, as one video stream is sent to user device 305, as opposed to a video stream for each reaction video and the video content itself.

In some implementations, reaction video determination module 420 may provide the reaction videos to content provider 315, which may combine the reaction videos with the originally requested content, and provide the combined video to user device 305. In some implementations, in lieu of combining reaction videos with the video content, social video reaction engine 310 may provide the reaction videos to user device 305, which may arrange the reaction videos in a user interface while playing the requested video content.

In some implementations, reaction videos may include (or be associated with) synchronization information, which may assist in presenting the reaction videos at the correct time. For example, some reaction videos may be relatively short (e.g., a few seconds), and the synchronization information may indicate a time position in the video content with which the reaction videos are associated (e.g., a portion of the video content that elicited a reaction from a user depicted in the reaction video).

Figure 8:
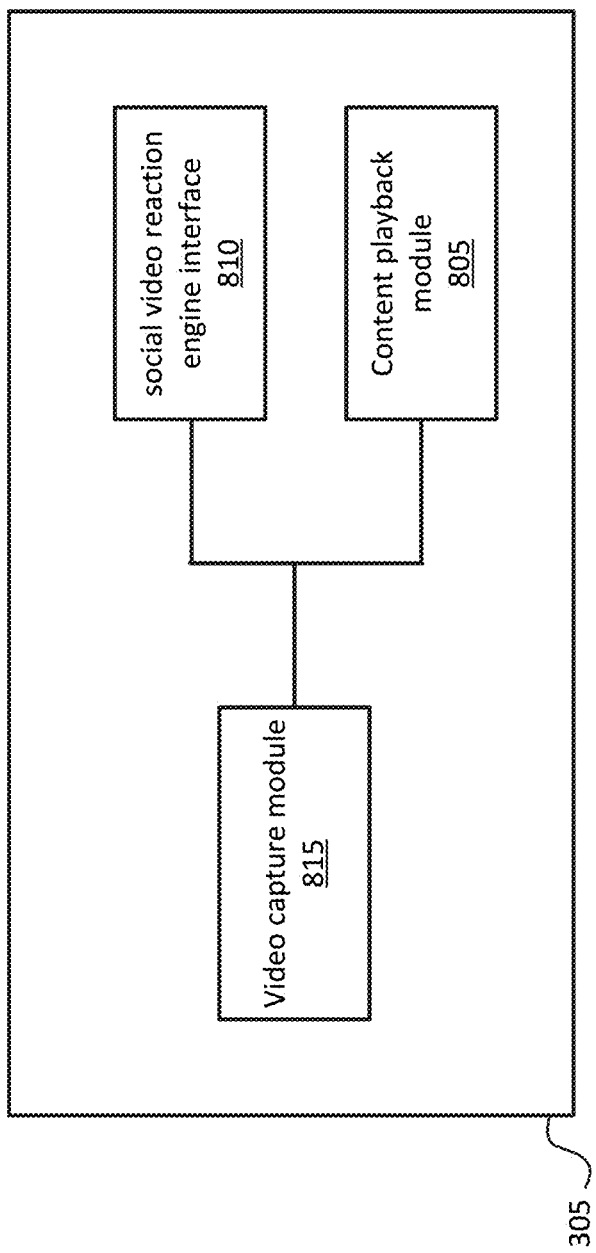
FIG. 8 illustrates example functional components of a user device.

FIG. 8 illustrates example components of user device 305, in accordance with some implementations. As shown, user device 305 may include content playback module 805, social video reaction engine interface 810, and video capture module 815. Some or all of components 805-815 may be implemented as hardware circuitry, software logic, and/or some combination thereof. In some implementations, user device 305 may include additional components, fewer components, and/or differently arranged components than shown in FIG. 8. In some implementations, one or more components, shown in FIG. 8, may be implemented by a device external to user device 305.

Content playback module 805 may receive requests to play contact, retrieve the content, and play the content back. For example, a user may select video content (such as streaming video content) in a user interface presented by content playback module 805. Content playback module 805 may contact content provider 315, in order to obtain the video content. Additionally, or alternatively, content playback module 805 may notify (e.g., via social video reaction engine interface 810) social video reaction engine 310 that user device 305 has received a request for particular content. Content playback module 805 may output information identifying user device 305 and/or the user of user device 305. For instance, content playback module 805 may output a device identifier associated with content playback module 805 (e.g., an International Mobile Subscriber Identity ("IMSI"), an International Mobile Station Equipment Identity ("IMEI"), a media control access ("MAC") address, a mobile device number ("MDN"), and/or some identifier of user device 305) to social video reaction engine 310. Content playback module 805 may also output information identifying the selected content, such as a name of the content, an address (e.g., a uniform resource locator ("URL")) associated with the content, etc.

Social video reaction engine interface 810 may be an interface, such as an implementation of an API, via which user device 305 communicates with social video reaction engine 310. For instance, as mentioned above, social video reaction engine interface 810 may output, to social video reaction engine 310, an identifier associated with user device 305, and/or an identifier of content to be presented by user device 305 (e.g., content requested by a user). Social video reaction engine interface 810 may receive, from social video reaction engine 310, an indication that reaction videos are available from friends of the user of user device 305, and may also receive a request for consent to capture a reaction video at user device 305, while the user watches the content. Social video reaction engine interface 810 may communicate with content playback module 805, in order to cause content playback module 805 to request consent from the user (e.g., via a pop-up dialog box, as shown in FIG. 1). In some implementations, social video reaction engine interface 810 may request the consent from the user (e.g., without communicating with content playback module 805). Once consent is obtained from the user, social video reaction engine interface 810 may notify social video reaction engine 310 that consent has been obtained, and may receive reaction videos from social video reaction engine interface 810. In some implementations, social video reaction engine interface 810 may receive combined video content (e.g., a single video stream that includes the video content, in addition to the reaction videos), and may pass the combined video content to content playback module 805. Content playback module 805 may play the received video (e.g., the requested video content and the reaction videos, or the combined video content).

When playing the video content and/or the reaction videos, content playback module 805 may present options for selecting a particular display area for more prominent viewing and/or hiding. For example, display areas, in which friends' reaction videos are being played, may be selectable, and may be expanded or hidden based on a selection. Specifically, for instance, a user may "click" (e.g., touch, on a touchscreen) a display area where a particular friend's reaction video is being played, which may cause the friend's reaction video to be enlarged, to take up the entire screen, or to be hidden. Similarly, as another example, the user may click a display area in which the video content is being presented, which may cause the video content to be displayed more prominently (e.g., may cause reaction videos to be hidden, to be reduced in size, and/or moved to a particular portion of the screen, such as one corner, across the top of the screen, etc.). In some implementations, friends' reaction videos may be able to be resized and/or moved to a portion of the screen (e.g., by a dragging operation on a touchscreen).

In some implementations, content playback module 805 may present options for disabling audio associated with reaction videos. In some implementations, content playback module 805 may present options for increasing and/or decreasing the audio volume associated with reaction videos.

In some implementations, content playback module 805 may offer options for a user to enable and/or disable reaction videos (e.g., via a selectable button or via another technique, such as gestures). For example, if a user swipes down (or swipes the reaction video off the screen) while a reaction video is being presented, content playback module 805 may hide the reaction video that is currently being presented. As another example, if a user swipes down (or swipes the reaction video off the screen) during the presentation of video content, all reaction videos may be hidden (e.g., not presented). On the other hand, if a user swipes up or selects another option (e.g., after reaction videos have been selected to be hidden), reaction videos may be enabled (e.g., presented when available).

Video capture module 815 may include, or be communicatively coupled with, one or more input devices, such as an audio input device (e.g., a microphone) and an optical input device (e.g., a camera). Video capture module 815 may record a user of user device 305, once the user has provided consent to be recorded, while the user watches the video content (and/or the received reaction videos). Video capture module 815 may provide the recorded reaction video, of the user, to social video reaction engine 310 (e.g., via social video reaction engine interface 810).

Figure 9:
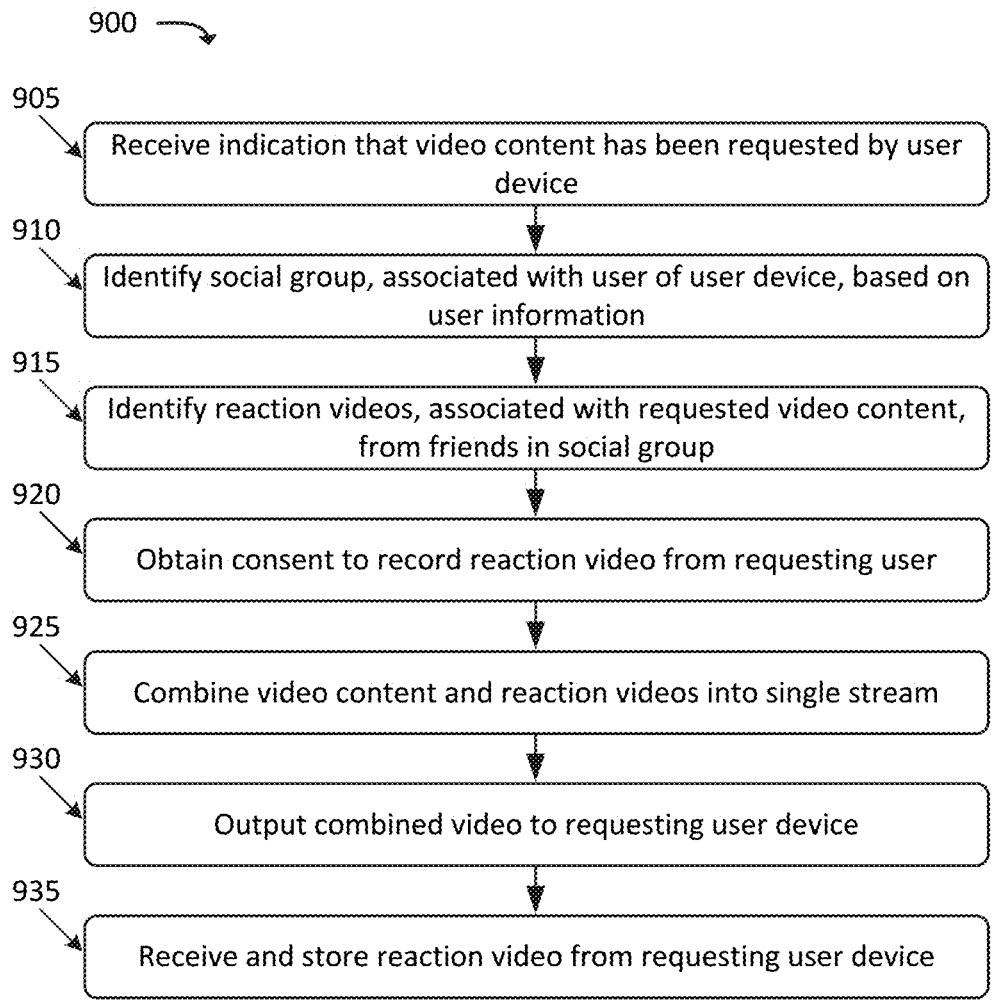
FIGS. 9 and 10 illustrate example processes for providing reaction videos to a user device, and also for collecting a reaction video from the user device.

FIG. 9 illustrates an example process 900 for providing reaction videos to a user device, as well as obtaining reaction videos from the user device. In some implementations, process 900 may be performed by social video reaction engine 310 (e.g., by one or more components discussed above with respect to FIG. 4). In other implementations, some or all of process 900 may be performed by one or more other devices in addition to, or in lieu of, social video reaction engine 310.

As shown, process 900 may include receiving (at 905) an indication that video content has been requested by a user device. For example, as described above with respect to content playback monitoring module 415, social video reaction engine 310 may receive that a user of user device 305 has requested that video content be provided to user device 305. For instance, social video reaction engine 310 may receive an indication from user device 305, or from content provider 315, that user device 305 has requested streaming video content from content provider 315.

Process 900 may also include identifying (at 910) a social group, associated with a user of the user device, based on user information. For example, as described above with respect to user information repository 405 and social group identification module 410, social video reaction engine 310 may identify one or more other users (i.e., users other than a user associated with user device 305) who are in a social group of the user of user device 305. In some implementations, social video reaction engine 310 may determine the social group prior to receiving (at 905) the indication that the user of user device 305 has requested the content.

Process 900 may further include identifying (at 915) reaction videos, associated with the requested video content, from friends in the social group. For example, as described above with respect to reaction video determination module 420 and reaction video repository 425, social video reaction engine 310 may determine whether any previously received reaction videos, associated with the video content, were provided by friends in the user's social group. In some implementations, social video reaction engine 310 may select a quantity of reaction videos, when the quantity of available reaction videos exceeds a maximum threshold. For example, as discussed above, social video reaction engine 310 may select reaction videos from friends with the closest relationship to the user, from friends who like the same types of genres as the user, etc.

Process 900 may additionally include obtaining (at 920) obtaining consent to record a reaction video from the user who requested the video content. For example, as described above, social video reaction engine 310 may output a request to user device 305, indicating that reaction videos are available from friends of the user of user device 305, and may request that the user provide consent to record his or her own reactions to the video content.

Process 900 may also include combining (at 925) the video content with the reaction videos, of the friends in the social group, into a single stream. For example, as described above with respect to video combining module 430 and FIG. 7, social video reaction engine 310 may combine the requested video content into a combined video stream.

Process 900 may further include outputting (at 930) the combined video to user device 305. In some implementations, social video reaction engine 310 may forgo the combining of the reaction videos with the video content, and may provide the reaction videos to user device 305 (e.g., may combine multiple reaction videos into a single stream, or may provide multiple reaction videos in multiple respective streams).

Process 900 may additionally include receiving and storing (at 935) a reaction video from the user device. For example, as described above, during presentation of the video content, user device 305 may record the user (e.g., via a front-facing camera of user device 305), in order to capture the user's reactions to the video content.

Figure 10:
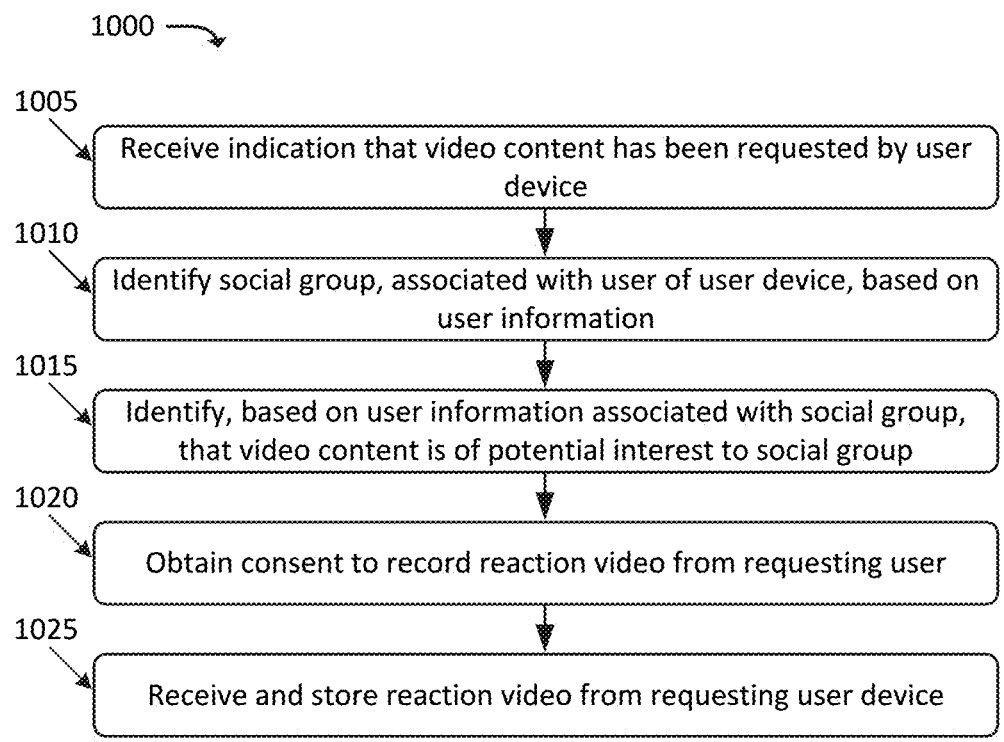

FIG. 10 illustrates an example process 1000 for providing reaction videos to a user device, as well as obtaining reaction videos from the user device. In some implementations, process 1000 may be performed by social video reaction engine 310 (e.g., by one or more components discussed above with respect to FIG. 4). In other implementations, some or all of process 1000 may be performed by one or more other devices in addition to, or in lieu of, social video reaction engine 310. Some of the blocks, shown in FIG. 10, are similar to those described above with respect to FIG. 9, and will not be discussed again in detail, for the sake of brevity.

As shown, process 1000 may include receiving (at 1005) an indication that video content has been requested by a user device. Process 1000 may also include identifying (at 1010) a social group, associated with a user of the user device, based on user information.

Process 1000 may further include identifying (at 1015), based on user information associated with the social group, that the video content is of potential interest to the social group. For example, social video reaction engine 310 may determine one or more attributes associated with the social group. For instance, social video reaction engine 310 may determine that a genre of the video is a genre that is of particular interest to one or more friends in the user's social group. For instance, social video reaction engine 310 may receive information indicating the genre of the video content (e.g., from content provider 315 and/or from another source, such as a database that stores information regarding video content).

As another example, social video reaction engine 310 may determine, based on the demographics of one or more friends in the user's social group, that the video content is of potential interest to the social group. For example, social video reaction engine 310 may receive information indicating demographics of users who took interest in the video content (e.g., an age and/or gender of users who accessed or purchased the video content, and/or who reviewed the video content favorably, etc.), and may compare the demographics of such users to the demographics of users in the social group. For instance, assume that a particular video content item is a movie that was rated four stars out of five by 95% of females between the ages of 18 and 25 years old. Further assume that 75% of the friends in the social group, of the user of user device 305, are females between the ages of 18 and 25 years old. In this scenario, the movie may be considered (at 1015) to be of potential interest to the social group.

Identifying (at 1015) that video content is of potential interest to a social group may be useful when obtaining reaction videos, when a relatively small quantity (or zero) reaction videos are available, for a particular video content item, from a social group. In some implementations, this identification (at 1015) may be performed in addition to identifying (at 915) currently existing reaction videos for a particular content item. Process 1000 may additionally include obtaining (at 1020) consent to record a reaction video from the user, and receiving and storing (at 1025) the reaction video from the user device.

Figure 11A:
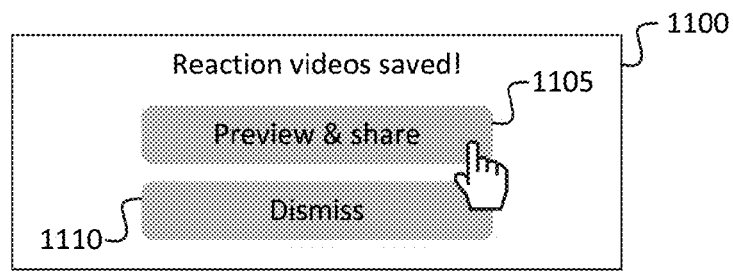
FIGS. 11A-11C illustrate example user interfaces relating to sharing reaction videos.
Figure 11B:
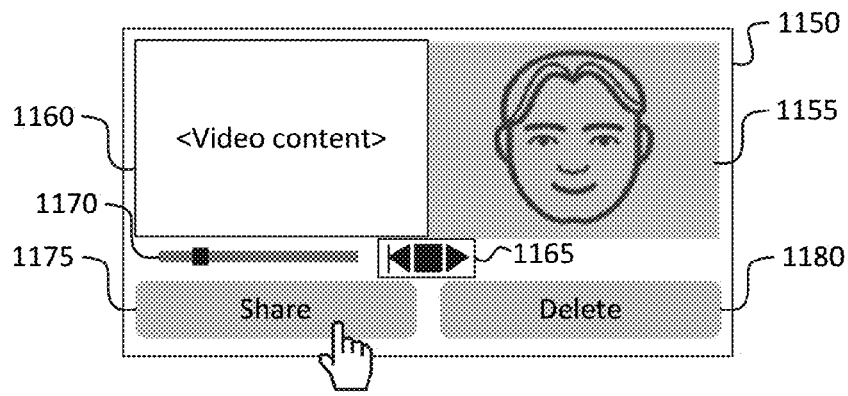
Figure 11C:
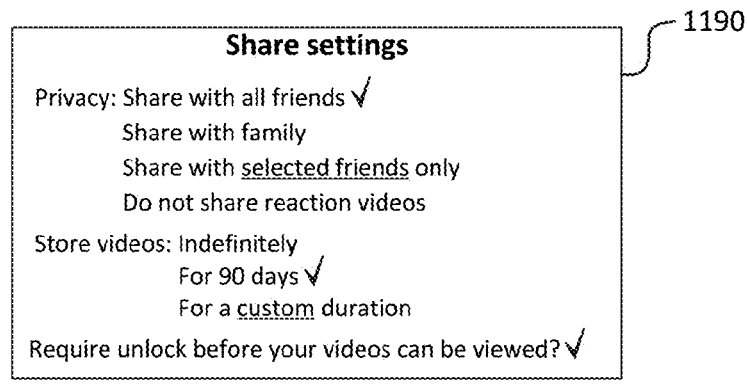

FIGS. 11A-11C illustrate example user interfaces 1100, 1150, and 1190, which may be used by a user to preview a recently captured reaction video and/or to modify sharing settings associated with the reaction video. User interface 1100, shown in FIG. 11A, may be presented after a reaction video is captured at user device 305, via which a user is watching content and has provided consent for reaction videos to be captured. For instance, user interface 1100 may be displayed as a "pop-up," after the user has finished watching the content.

In some implementations, the reaction video may correspond to one or more portions of the captured video in which the user has reacted to the video (e.g., has made a facial expression and/or noise consistent with a reaction, such as a wide-eyed facial expression and a yelp (which may correspond to a frightened reaction), a smiling facial expression and a laugh (which may correspond to a reaction to comedic content), etc.). As an example, for a two-hour movie, four reaction videos may have been captured (e.g., user device 305 may have identified four reactions while capturing video of the user during the two-hour movie).

User interface 1100 may present options to preview, share, and/or dismiss the captured reaction videos. As shown, these options may be presented as buttons 1105 and/or 1110. For instance, button 1105 may allow a user to preview and share the captured reaction video(s), while button 1110 may allow a user to dismiss (e.g., discard or delete) the reaction videos without first previewing them. In some implementations, an option may be presented to share the captured reaction videos without first previewing them.

Assume that the selects button 1105, to preview and share the captured reaction videos. User interface 1150, shown in FIG. 11B, may provide previewing and sharing options. For example, display area 1155 may show a preview of a captured reaction video of the user, and display area 1160 may show the video content that was playing while the reaction video was captured. Play controls 1165 may include options to play, stop, and/or rewind the reaction video (and the corresponding portion of the video content). Timeline 1170 may show a time point, in the video content, that is currently being shown in display area 1160 (and to which the reaction video corresponds).

If the user is happy with the reaction video, he or she may select button 1175, which may cause the reaction video to be shared (e.g., provided to social video reaction engine 310). Button 1180 may allow the reaction video to be deleted (e.g., without being provided to social video reaction engine 310).

Assume that the user selects button 1175, to share the captured reaction video. In some implementations, another reaction video may be presented for preview (e.g., via user interface 1150). In some implementations, sharing settings may be presented for the reaction video (e.g., via user interface 1190, shown in FIG. 11C). The sharing settings may include settings such as privacy options, a duration of time that reaction videos should be stored and available to share, a preference regarding whether a friend must unlock reaction videos be shown, and/or other settings.

The sharing settings may be global for the user (e.g., may apply to all of his or her reaction videos), or may be set on a per-reaction video basis (i.e., different reaction videos may have different sharing settings). As shown, for instance, the user may select an option to share reaction videos with all friends, or with subsets of friends. The subsets may include pre-defined subsets (e.g., automatically or manually defined groups, such as family) or manually selected friends. The privacy options may include an option not to share a particular reaction video (or all reaction videos) at all.

User interface 1190 may also include an option to set a duration of time, during which the reaction videos are available. For example, the user may specify that reaction videos are available indefinitely, for a predetermined amount of time (e.g., 90 days), or for a custom duration of time. User interface 1190 may also allow a user to require "unlock" before his or her reaction videos can be viewed. For instance, as described above, a video may be "unlocked" by a friend when the friend agrees to provide his or her own reaction video.

Figure 12A:
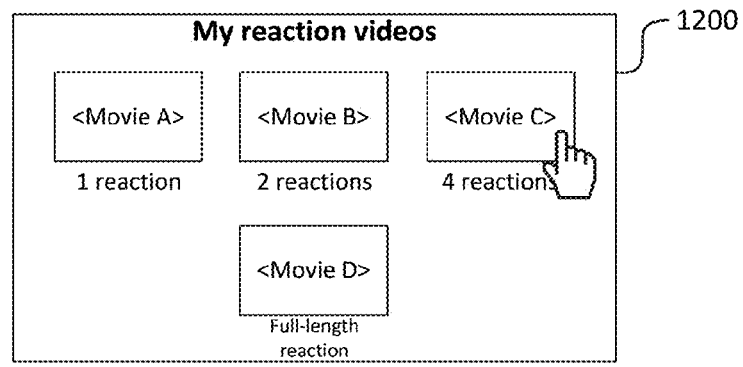
FIGS. 12A and 12B illustrate example user interfaces that a user may use to preview his or her stored reaction videos.
Figure 12B:
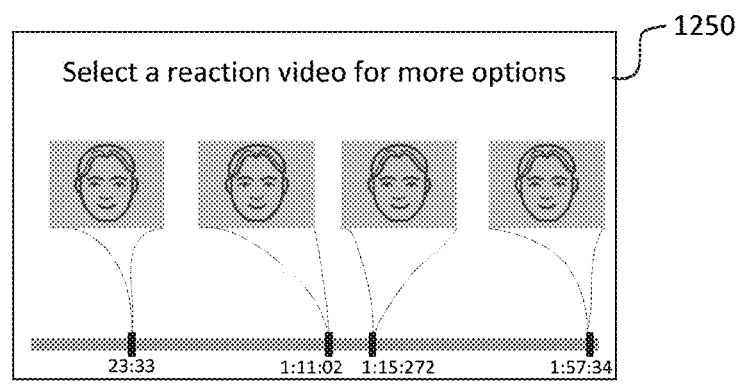

FIGS. 12A and 12B illustrate example user interfaces 1200 and 1250, which may be used to manage reaction videos associated with a user. For example, user interface 1200 may indicate, to a user, that reaction videos have been captured for the user for four example items of content: Movie A, Movie B, Movie C, and Movie D. The captured reaction videos may correspond to reaction videos stored by social video reaction engine 310, stored locally by user device 305, or both.

Assume, for instance, that the user wishes to view his or her reaction videos for Movie C, for which four reaction videos have been captured. Upon selection of a selectable graphical item in user interface 1200, that corresponds to Movie C, user interface 1250 may be presented. As shown in FIG. 12B, user interface 1250 may include thumbnails (e.g., thumbnail still images, or thumbnail-sized movies) that each correspond to a particular reaction video, of the user, and are associated with Movie C. User interface 1250 may also include a timeline, that indicates a time point, in the particular video content, to which the reaction videos correspond. For example, in the example shown in FIG. 12B, the first reaction video may correspond to the time point 23:33 of Movie C (i.e., 23 minutes and 33 minutes into Movie C), the second reaction video may correspond to the time point 1:11:02, and so on.

In some implementations, the thumbnails, in user interface 1250, may be user selectable. The selection of a particular thumbnail may, for example, cause user interface 1150 and/or 1190 (as shown in FIGS. 11B and 11C) to be presented, so that a user can choose and/or view settings associated with the reaction video that corresponds to the particular thumbnail.

Figure 13:
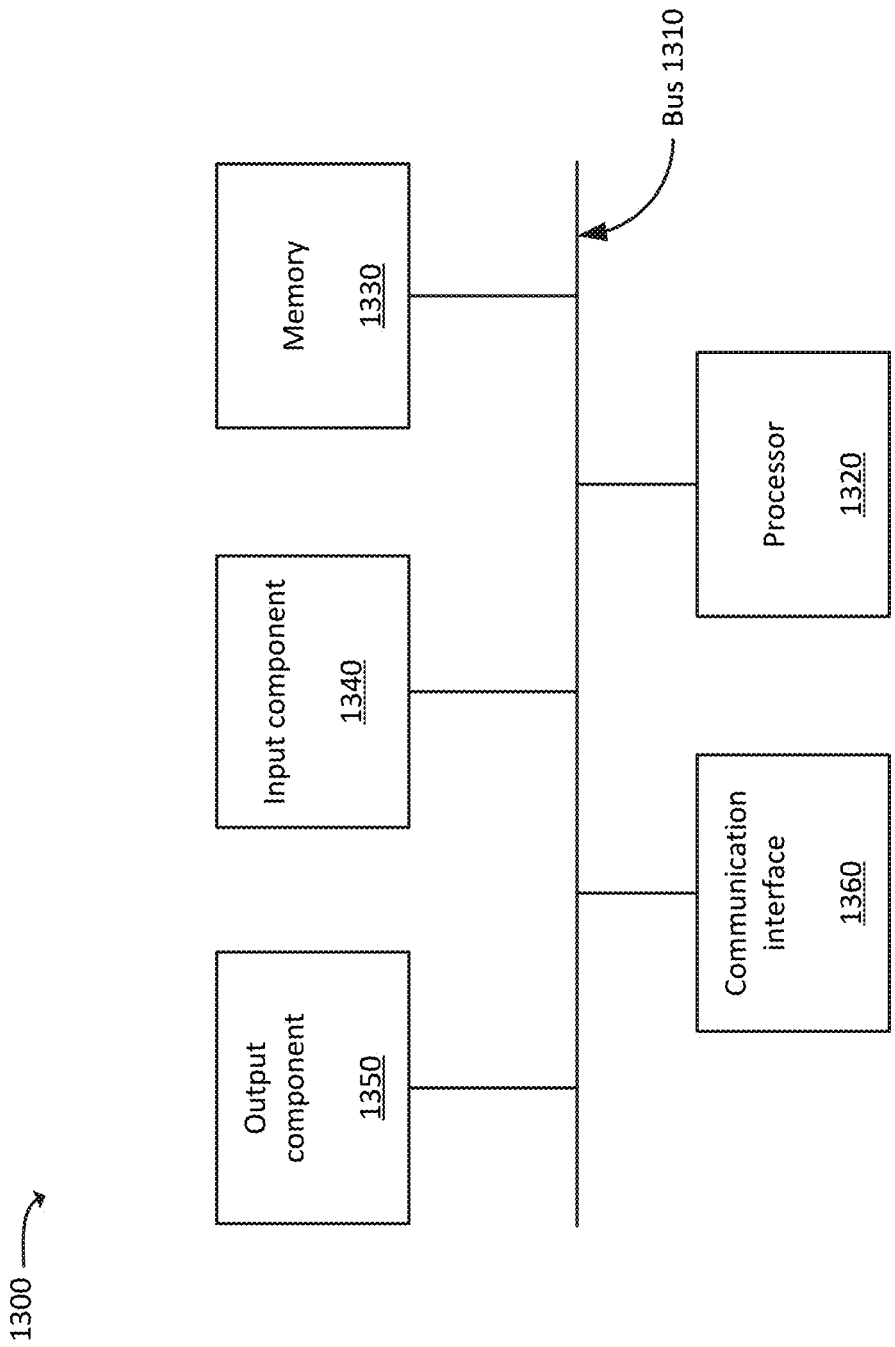
FIG. 13 illustrates example components of a device, in accordance with some implementations described herein.

FIG. 13 is a diagram of example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

As another example, in some implementations, various techniques, some examples of which have been described above, may be used in combination, even though such combinations are not explicitly discussed above. Furthermore, some of the techniques, in accordance with some implementations, may be used in combination with conventional techniques.

Additionally, while series of blocks have been described with regard to FIGS. 9 and 10, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Furthermore, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term"greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A server device, comprising:
 a memory device storing a set of processor-executable instructions; and
 one or more processors configured to execute the processor-executable instructions, wherein executing the processor-executable instructions causes the one or more processors to:

identify a social group associated with a user of a user device, the social group including one or more users other than the user of the user device;
receive an indication that the user device has requested that a particular content item be provided to the user device;
identify one or more reaction videos associated with:
at least one of the one or more users in the social group, and
the particular content item,
wherein the one or more reaction videos include video, of the at least one or more users, captured during presentation of the particular content item at a user device associated with the at least one of the one or more users in the social group;
provide a notification to the user device that the one or more reaction videos are available but are locked unless the user of the user device consents to capture a reaction video of the user while accessing the particular content item;
receive consent, from the user device, to capture a reaction video of the user of the user device while accessing the particular content item; and
provide the identified one or more reaction videos, of the at least one or more users in the social group, to the user device based on receiving the consent to capture the reaction video of the user of the user device while accessing the particular content item.

2. The server device of claim 1, wherein executing the processor-executable instructions further causes the one or more processors to:
request, based on identifying the one or more reaction videos, consent from the user of the user device to capture the reaction video of the user during presentation of the particular content item at the user device,
wherein the consent, from the user device, is received in response to the request for consent from the user of the user device.

3. The server device of claim 1, wherein executing the processor-executable instructions further causes the one or more processors to:
receive and store the reaction video, captured by the user device during presentation of the particular content item at the user device.

4. The server device of claim 1, wherein the one or more reaction videos include a plurality of reaction videos, wherein executing the processor-executable instructions further causes the one or more processors to:
select a particular reaction video, out of the plurality of reaction videos, the selecting being performed based on a closeness of a relationship between:
the user of the user device, and
the user associated with the particular reaction video.

5. The server device of claim 1, wherein the one or more reaction videos include a plurality of reaction videos, wherein executing the processor-executable instructions further causes the one or more processors to:
select a particular reaction video, out of the plurality of reaction videos, the selecting being performed based on comparing:
a set of genres preferred by the user of the user device, and
a set of genres preferred by the user associated with the particular reaction video.

6. The server device of claim 1, wherein executing the processor-executable instructions further causes the one or more processors to:
receive the particular content item;
combine the selected particular content item with the identified one or more reaction videos to obtain a combined video; and
output the combined video to the user device.

7. The server device of claim 1, wherein the social group is identified prior to receiving the indication that the user device has requested the particular content item.

8. The server device of claim 1, wherein the indication, that the user has requested the particular content item, is received from a content provider that hosts the content.

9. A method, comprising:
identifying, by a server device, a social group associated with a user of a user device, the social group including one or more users other than the user of the user device;
receiving, by the server device, an indication that the user device has requested that a particular content item be provided to the user device;
identifying, by the server device, one or more reaction videos associated with:
at least one of the one or more users in the social group, and
the particular content item,
wherein the one or more reaction videos include video, of the at least one of the or more users of the social group, captured during presentation of the particular content item at a user device associated with the at least one or more users;
providing, by the server device and to the user device, a notification that the one or more reaction videos are available but are locked unless the user of the user device consents to capture a reaction video of the user while accessing the particular content item;
receiving, by the server device and from the user device, consent to capture a reaction video of the user of the user device while accessing the particular content item; and
providing, by the server device and to the user device, based on receiving the consent to capture the reaction video of the user of the user device while accessing the particular content item, the identified one or more reaction videos of the at least one or more users in the social group.

10. The method of claim 9, further comprising:
requesting, based on identifying the one or more reaction videos, consent from the user of the user device to capture the reaction video of the user during presentation of the particular content item at the user device,
wherein the consent, from the user device, is received in response to the request for consent from the user of the user device.

11. The method of claim 9, further comprising:
receiving and storing the reaction video, captured by the user device during presentation of the particular content item at the user device.

12. The method of claim 9, wherein the one or more reaction videos include a plurality of reaction videos, the method further comprising:
selecting a particular reaction video, out of the plurality of reaction videos, the selecting being performed based on a closeness of a relationship between:
the user of the user device, and
the user associated with the particular reaction video.

13. The method of claim 9, wherein the one or more reaction videos include a plurality of reaction videos, the method further comprising:

selecting a particular reaction video, out of the plurality of reaction videos, the selecting being performed based on comparing:
  a set of genres preferred by the user of the user device, and
  a set of genres preferred by the user associated with the particular reaction video.

14. The method of claim 9, further comprising:
receiving the particular content item;
combining the selected particular content item with the identified one or more reaction videos to obtain a combined video; and
output the combined video to the user device.

15. The method of claim 9, wherein the social group is identified prior to receiving the indication that the user device has requested the particular content item.

16. The method of claim 9, wherein the indication, that the user has requested the particular content item, is received from a content provider that hosts the content.

17. A non-transitory computer-readable medium storing a set of processor-executable instructions, which, when executed by one or more processors of a device, cause the one or more processors to:
  identify a social group associated with a user of a user device, the social group including one or more users other than the user of the user device;
  receive an indication that the user device has requested that a particular content item be provided to the user device;
  identify one or more reaction videos associated with:
    at least one of the one or more users in the social group, and
    the particular content item,
    wherein the one or more reaction videos include video, of the at least one or more users, captured during presentation of the particular content item at a user device associated with the at least one of the one or more users in the social group;
  provide a notification to the user device that the one or more reaction videos are available but are locked unless the user of the user device consents to capture a reaction video of the user while accessing the particular content item;
  receive consent, from the user device, to capture a reaction video of the user of the user device while accessing the particular content item; and
  provide the identified one or more reaction videos, of the at least one or more users in the social group, to the user device based on receiving the consent to capture the reaction video of the user of the user device while accessing the particular content item.

18. The non-transitory computer-readable medium of claim 17, wherein the set of processor-executable instructions further include processor-executable instructions to:
  request, based on identifying the one or more reaction videos, consent from the user of the user device to capture the reaction video of the user during presentation of the particular content item at the user device, wherein the consent, from the user device, is received in response to the request for consent from the user of the user device.

19. The non-transitory computer-readable medium of claim 17, wherein the set of processor-executable instructions further include processor-executable instructions to:
  receive and store the reaction video, captured by the user device during presentation of the particular content item at the user device.

20. The non-transitory computer-readable medium of claim 17, wherein the one or more reaction videos include a plurality of reaction videos, wherein the set of processor-executable instructions further include processor-executable instructions to:
  select a particular reaction video, out of the plurality of reaction videos, the selecting being performed based on a closeness of a relationship between:
    the user of the user device, and
    the user associated with the particular reaction video.

* * * * *